(No Model.)
P. CONWAY.
VALVE.
No. 425,756. Patented Apr. 15, 1890.
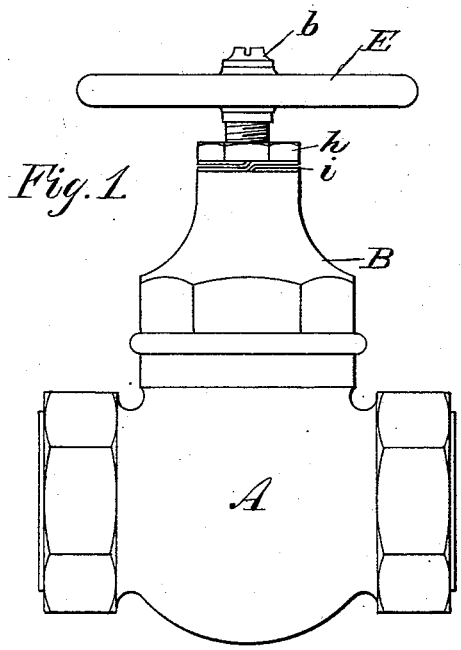
Fig. 1.
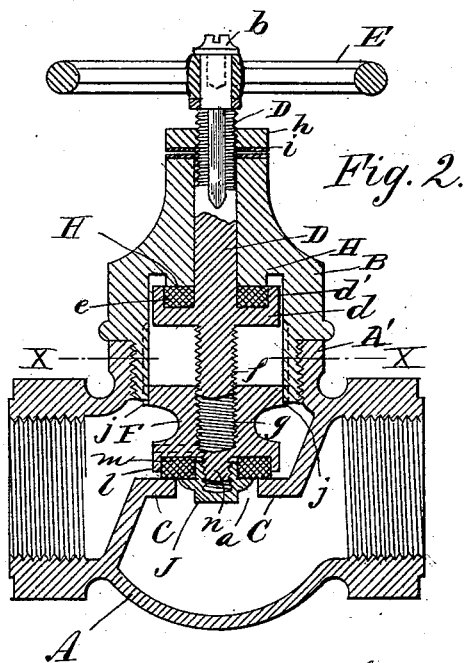
Fig. 2.
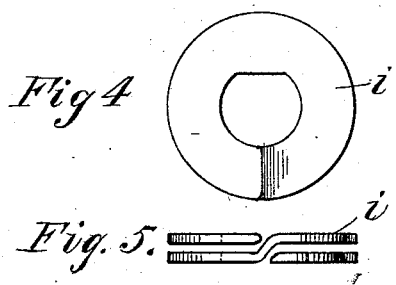
Fig. 4.
Fig. 5.
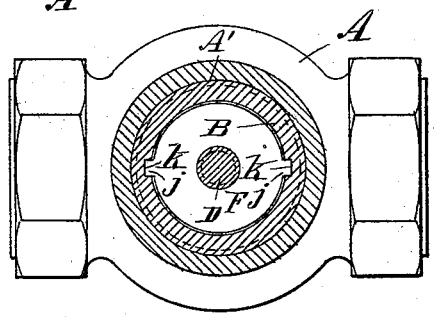
Fig. 3.
WITNESSES:
INVENTOR:
P. Conway
BY
Munn & Co.
ATTORNEYS

UNITED STATES PATENT OFFICE.

PATRICK CONWAY, OF NEW YORK, N. Y.

VALVE.

SPECIFICATION forming part of Letters Patent No. 425,756, dated April 15, 1890.

Application filed December 17, 1889. Serial No. 334,020. (No model.)

*To all whom it may concern:*

Be it known that I, PATRICK CONWAY, of the city, county, and State of New York, have invented a new and Improved Valve, of which the following is a full, clear, and exact description.

My invention relates to improvements in valves, and especially to steam-valves, although it may be used for other purposes; and the object of my invention is to provide a simple and positive valve that may be cheaply made and that will be very durable.

To this end my invention consists in a valve having the various parts constructed and combined substantially as hereinafter described, and specifically pointed out in the claim.

Reference is to be had to the accompanying drawings, forming a part of this specification, in which similar letters of reference indicate corresponding parts in all the figures.

Figure 1 is a side elevation of a valve embodying my invention; Fig. 2, a vertical longitudinal section of the same; Fig. 3, a cross-section on the line $xx$ of Fig. 2; Fig. 4, a plan view of a spring that encircles the valve-stem, and Fig. 5 a side elevation of the same.

The valve-case A is of the usual construction, having a thread at each end by which it is attached to the steam-pipes, a circular upper opening A', provided with a thread into which the bonnet B is screwed, and a seat C, of the usual form, having a flat surface for the packing around the lower end of the valve-stem D to rest upon, and a circular port $a$, through which the steam passes when the valve is open.

The valve-stem D is provided with a handle E, which is attached thereto by a screw $b$ in the usual manner. The valve-stem extends downwardly through the bonnet B, is provided with a disk $d$, having an annular flange $d'$, adapted to receive and hold a rubber washer or packing-piece $e$, and its lower end below said disk is provided with a screw-thread $f$, which fits a corresponding thread $g$ in the disk F.

The upper portion of the valve-stem D between the handle E and the top of the bonnet B is threaded and flattened upon the sides, and is provided with a nut $h$ and spring $i$, the nut fitting the thread upon the stem and the spring being flattened upon the inner side, so as to fit the stem D closely and turn with it. By turning down the nut $h$ it will bear upon the spring $i$ and bonnet B, so that the stem D will be raised, thus bringing the packing-washer $e$ against the seat H in the upper part of the bonnet B and securely packing the upper part of the valve.

The disk F is provided upon two opposite sides with projecting lugs $j$, which fit and slide in the vertical grooves $k$ upon the inner sides of the bonnet B. The lower part of the disk F is provided with a downwardly-extending annular flange $l$, adapted to inclose the packing-washer $m$, which fits therein and may rest upon the seat C, and with a downwardly-extending boss $n$, having a screw-thread cut thereon, so that the cap J, which is provided with a corresponding thread, may be screwed thereon, and thus hold the packing-washer $m$ in position around the boss $n$ and within the flange $l$.

The valve is operated as follows: By turning the handle E in one direction the stem D will be turned, and the thread $f$ upon the lower end of the stem will engage the thread $g$ of the disk F, and thus raise the disk F, the lugs $j$ sliding in the grooves $k$ and the disk moving up into the bonnet B. The packing-piece $m$ will thus be raised from the seat C, opening the port and allowing the steam to pass through the same. By turning the handle E in the opposite direction the thread $f$ of the stem D, engaging the thread $g$ of the disk F, will force the disk downwardly, thus bringing the packing-piece $l$ firmly upon the seat C, closing the valve. When the handle E and stem D are turned in either direction, the nut $h$ and spring $i$ will turn with the stem. The spring bearing against the nut will keep the stem elevated, so that the packing-piece $e$ will constantly bear against the seat H, and will also prevent the nut from turning upon the stem and becoming loose.

In the ordinary steam-valve the packing is placed within a nut at the top of the bonnet and the constant friction soon wears away the packing and allows the steam to escape around the valve-stem; but in my invention the packing $e$, bearing against the smooth surface of the seat H, will wear a long time and will allow no steam to escape around the stem D.

Having thus described my invention, what I claim as new, and desire to secure by Letters Patent, is—

In a valve having a seat H in the upper part thereof, the combination, with the valve-stem D, having a disk $d$, with flange $d'$ and packing-piece $e$, to fit against said valve-seat, said stem having a flattened upper portion, as described, of the spring $i$ and nut $h$, adapted to hold the disk $d$ against the valve-seat, said spring having a flattened inner portion to fit the flat side of the valve-stem and prevent the nut $h$ from turning, substantially as described.

PATRICK CONWAY.

Witnesses:
GEORGE A. ANDERSON,
MARY CONWAY.